(12) United States Patent
Holzer

(10) Patent No.: US 6,429,590 B2
(45) Date of Patent: *Aug. 6, 2002

(54) STRAIGHT FLUORESCENT LAMP WITH SURFACE-MOUNTED ELECTRICAL CONDUIT

(76) Inventor: Walter Holzer, Drosteweg 19, D-88709 Meersburg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/289,512

(22) Filed: Apr. 9, 1999

(30) Foreign Application Priority Data

Jan. 12, 1999 (DE) .......................................... 199 00 870

(51) Int. Cl.⁷ ............................................... H05B 41/00
(52) U.S. Cl. ........................ 315/51; 315/326; 313/234
(58) Field of Search ................................ 313/234, 235, 313/622, 623, 624, 625, 631, 634; 315/51, 326

(56) References Cited

U.S. PATENT DOCUMENTS

| | | | | | |
|---|---|---|---|---|---|
| 3,872,340 A | * | 3/1975 | Collins | ...................... | 313/198 |
| 4,092,562 A | * | 5/1978 | Campbell | ................... | 315/189 |
| 4,093,893 A | * | 6/1978 | Anderson | .................... | 315/48 |
| 4,780,649 A | * | 10/1988 | Scholz et al. | ............... | 315/326 |
| 5,053,933 A | * | 10/1991 | Imria | ......................... | 362/221 |
| 5,391,960 A | * | 2/1995 | Moribayashi et al. | ....... | 313/594 |
| 6,036,522 A | | 3/2000 | Holzer | ....................... | 439/306 |
| 6,100,638 A | | 8/2000 | Shah | .......................... | 315/59 |

FOREIGN PATENT DOCUMENTS

DE         195 12 307 A1     10/1996

* cited by examiner

*Primary Examiner*—David Vu
(74) *Attorney, Agent, or Firm*—Marshall, Gerstein & Borun.

(57) ABSTRACT

A fluorescent lamp having electrical conduits on the outer surface of the gas discharge vessel. Electrical power is supplied to one end of the fluorescent tube, via a ballast assembly which is connected to a first electrode in the tube. The electrical conduits on the outer surface of the tube carry power to the electrode at the other end of the tube, thus eliminating the need for wiring within the tube mounting assembly.

7 Claims, 8 Drawing Sheets

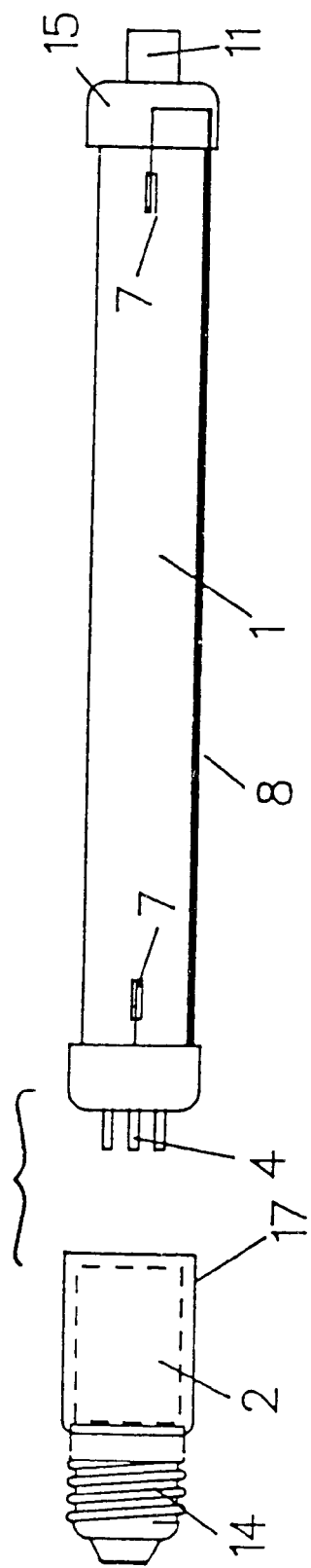

STRAIGHT FLUORESCENT LAMP WITH SURFACE-MOUNTED ELECTRICAL CONDUIT

BACKGROUND OF THE INVENTION

Although long, straight fluorescent lamps have the largest market share in lighting technology and have gained acceptance worldwide for many years, only a few significant improvements have been made in the further development of these lamps. These include the switch to electronic ballasts, a certain improvement in fluorescent material and a reduction in the diameter of the glass tube.

The high cost in the manufacture of lamps and light strips was perceived as a necessary evil and attempts were made to reduce the manufacturing costs by using terribly expensive robots. This primarily concerns the laying of millions of kilometers of connection lines in the lamps, whose electrodes must each be connected with two wires over the entire length of the lamps.

BRIEF SUMMARY OF THE INVENTION

The task of the invention is to radically reduce this expense, and not only to save costs, but also to devise additional lamp designs and applications of these energy-saving fluorescent lamps.

This objective is achieved by equipping these long, straight glass tubes, that serve as gas discharge vessels, on one end in the region of the first electrode with all required connections for connection to the electronic ballast and running the required connections to the second electrode outside of the glass tube. For example, this would also be possible with wires that are inserted in a longitudinal groove, in order to protect them from damage.

It is technologically much simpler to apply conductive coatings to the glass tube as connection lines, which are additionally covered with a protective layer.

The solution is simplified in that the number of required connection lines is reduced. This can be achieved according to the invention in that the second electrode is not heated, both ends of the coiled electrode then being simply connected to each other. This method is feasible, but, among other things, leads to a shortening of the lifetime of the lamp. It is better to use so-called "unheated, cold electrodes", which are equipped with a large amount of emitter paste and were deliberately developed with other measures for an unheated, cold start.

In order to make possible contact with the metal coatings nonhazardous, it is recommended according to the invention that these be made potential-free by a protective capacitor. Since transmission of the lamp current occurs with a high frequency to 100 kHz, only small capacitance values are required, which entail no contact hazard for a low line frequency of 50 or 60 Hz, especially if additional insulation protects against contact.

It is expedient to equip the lamps in the region of the second electrode, i.e., on the "free" end, with means to mount or support the lamp.

A significant additional improvement consists of providing the housing of the electronics with a base for insertion in a light socket. This produces a "compact" fluorescent lamp with integrated electronics, as are present in large numbers on the market in the small lamps for household use with a base on one side. In these lamps, the one-sided base is achieved in that the gas discharge vessel, i.e., the glass tube, is either bent in a U-shape or melted together from two individual glass tubes, a method that cannot be rationally used in long glass tubes.

The subsequent figures serve for understanding of the inventive concept and its progressiveness. They cannot describe all the details of the invention, since there are numerous manufacturing variants and design possibilities that permit application of the invention.

BRIEF DESCRIPTION OF THE DRAWINGS

FIG. 5 shows a compact fluorescent lamp with a separable ballast.

DETAILED DESCRIPTION OF THE INVENTION

The following description provides practical examples of the invention. The same functional parts are given the same reference numbers in all figures.

Figure 1:
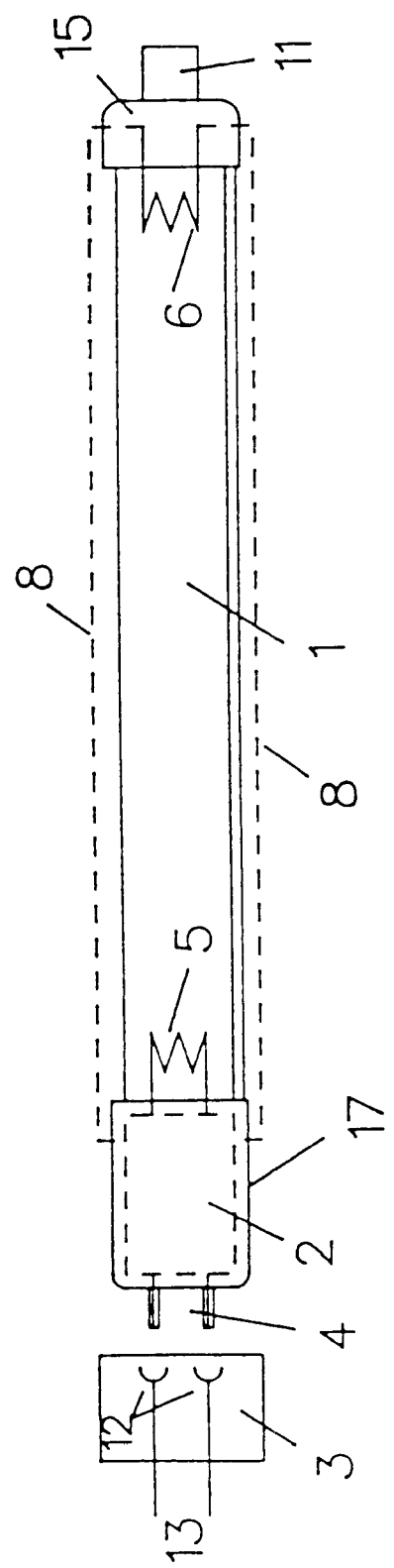
FIG. 1 and FIG. 1a show a fluorescent lamp mounted on one side with integrated ballast.
Figure 1A:
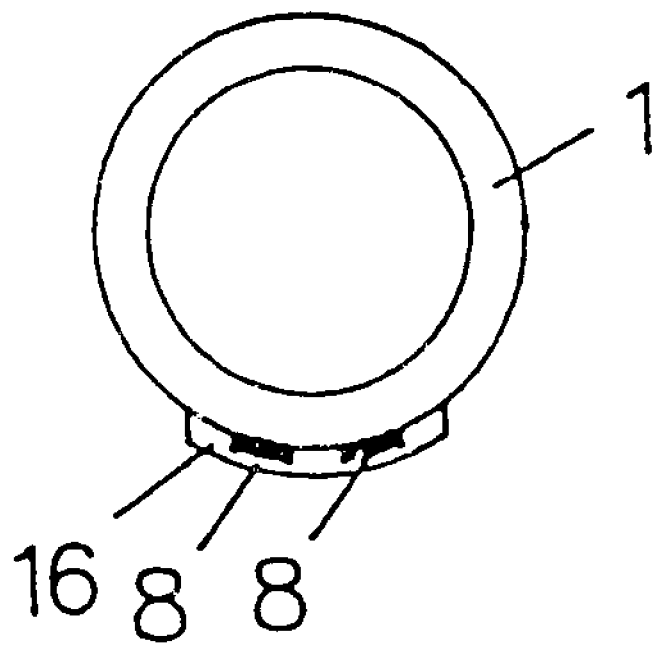
Figure 2:
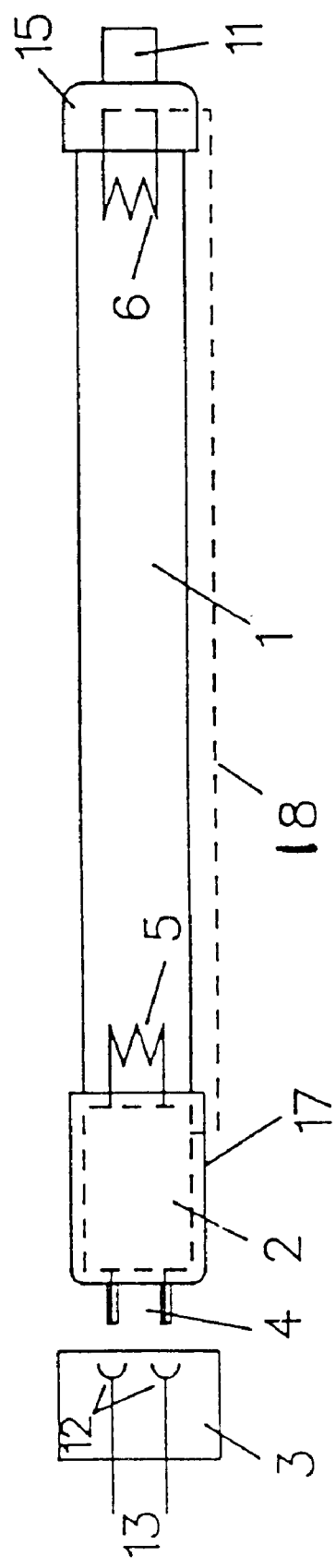
FIG. 2 and FIG. 2a show a lamp with a longitudinal groove mounted on one side.
Figure 2A:
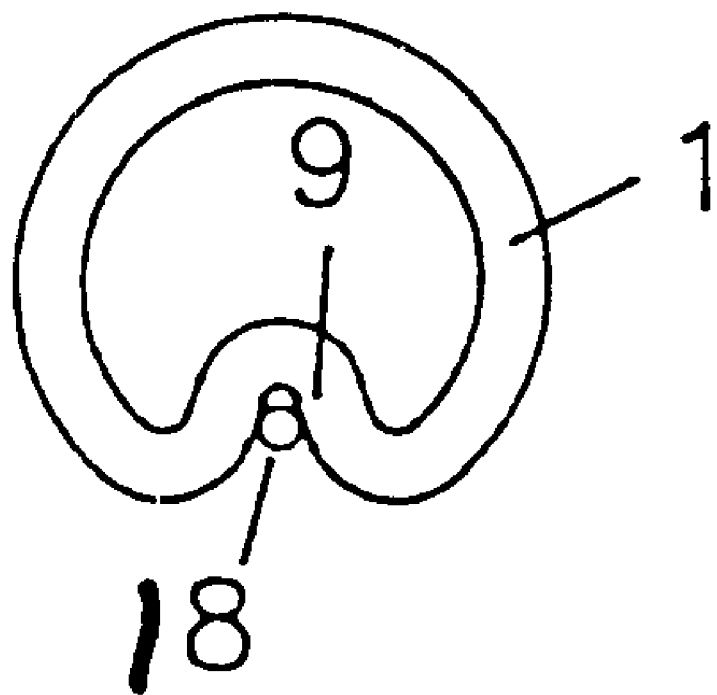

The gas discharge lamp (1) depicted in FIGS. 1 and 2 is equipped with two heated electrodes (5), (6), which require, in principle, two terminals. Two outer connection lines (8) are therefore schematically shown in FIG. 1, which supply the second electrode (6) without indicating how these run along gas tube (1). In the enlarged, also schematically depicted section of FIG. 1a, the connection lines (8) are shown as vapor-deposited or printed conductor paths, which are covered by an insulation layer (16).

The ballast (2) is accommodated in the housing (17), having a pin base (4), and can be plugged into a socket (3). The spring contacts (12) are on line voltage (13) and supply the lamp with the required voltage. On the other end, a glass tube (1) is protected from damage with an end cap (15). This end cap (15) can be designed in the usual shape as a combined metal-plastic part. The arrangement of a mount (11) to support the free end of the lamp is important. The mount (11) can be molded onto the plastic part of the end cap (15) or the otherwise common mass produced end caps with contact pins can also be used as mount.

FIG. 2 shows two additional details. The second electrode is initially simply shorted, in order to save outer connection (8). The remaining single outer connection (18) is shown as a wire embedded in a longitudinal groove of glass tube (1). The enlarged schematic section of FIG. 2 shows this.

The depicted longitudinal groove is not a special feature of this lamp, but has been provided by individual companies for many years to improve the ignition and burning properties of the gas discharge. This technology requires no special development.

Figure 3:
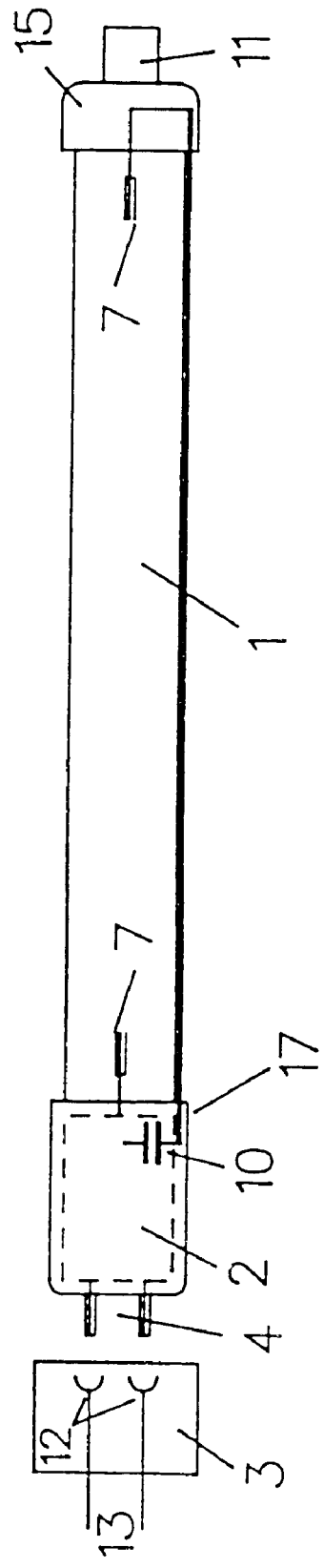
FIG. 3 and FIG. 3a show a lamp with an unheated, cold electrode mounted on one side.

The problem of the $2^{nd}$ electrode is solved in the example of FIG. 3, essentially in that two unheated electrodes (7) are provided, which withstand the more severe starting conditions without difficult when properly dimensioned.

Figure 3A:
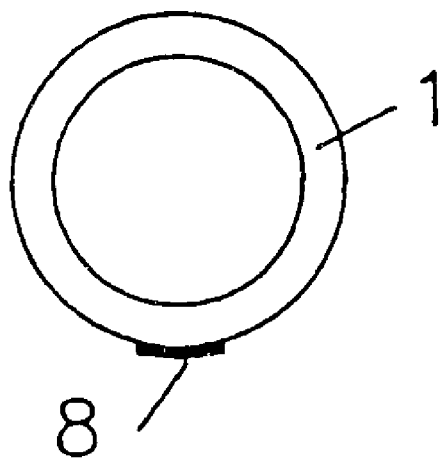

The outer connection (8) in this example, as shown in FIG. 3a, is depicted as a vapor-deposited or printed conducting path, which requires no additional contact protection if the capacitor (10) arranged in ballast (2) meets the safety provisions of the corresponding regional authorities.

An additional effect of the applied conducting path consists of the fact that a reduction of ignition voltage is obtained, as has been used already for many years by such ignition strips. This is primarily highly desirable at the otherwise increased ignition voltage in cold electrodes.

Figure 4:
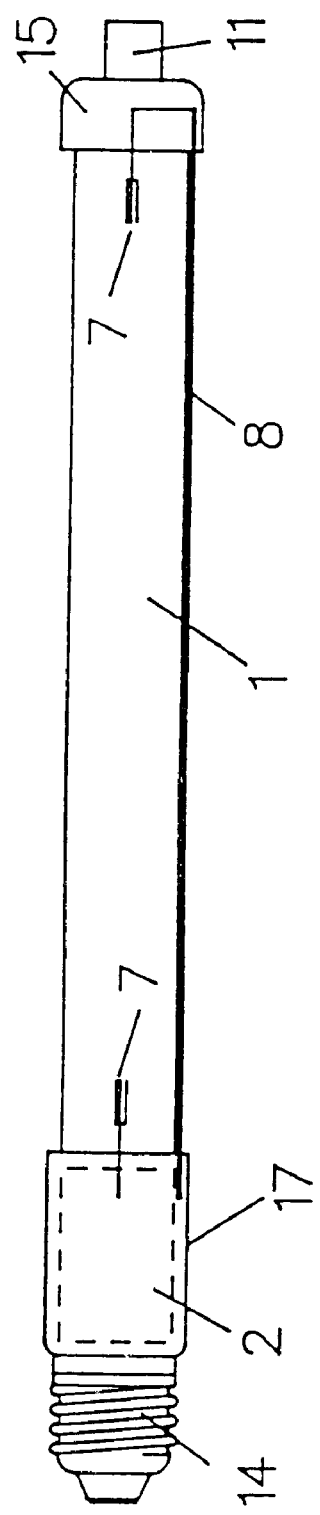
FIG. 4 shows a compact fluorescent lamp with an Edison screw base.

The example of FIG. 4 represents an expansion in principle. By arranging a base that can be inserted into the lamp sockets, the lamp becomes a compact fluorescent lamp with integrated ballast, a true market gap that can finally be filled. The shown Edison screw socket was chosen because it is well known. However, a protected-type socket system, for example, according to German Examined Patent Application D 197 07 048 A1, (whose U.S. counterpart is U.S. Pat. No. 6,036,352) is prescribed because of the present strict regulations.

FIG. 5 shows another example of how a lamp according to the invention can be used cost effectively. The gas discharge vessel (1) is equipped with a 3-pole pin base (4), which permits mechanical and electrical separation of the electronic ballast (2). Should the lamp become unusable, the ballast (2), which normally has a much longer lifetime, can be reused and only the lamp part need be replaced.

The basic idea of further developing a fluorescent lamp, consisting merely of a single, straight gas discharge to a lamp mounted on one side, offers a wide variety of application possibilities, as shown in the cited examples. As an additional example, the possibility can merely be mentioned of using the gas discharge lamp according to FIG. 5 in a base (3), in which an electronic ballast (2) is incorporated, a solution that appears to be both cost-effective and unbeatable, in terms of space requirements and service. A lamp that is equipped with such a combination requires almost no internal wiring.

The cited examples offer many additional hints that build on the invention and its indirect scope of protection. Any combination of properties shown in the examples is naturally possible. The examples in this respect are not to be interpreted as restrictive.

What is claimed is:

1. A fluorescent lamp comprising:
   a) a gas discharge vessel in the form of a straight glass tube having a first electrode at a first end of the glass tube and a second electrode at a second end of the glass tube;
   b) an electronic ballast electrically connected to said first electrode, said ballast having a housing, and a base on said housing for connecting said ballast to a source of electrical power;
   c) an electrical conduit comprising a continuous strip of electrically-conductive material affixed to the outer surface of the glass tube, said strip electrically connecting said first electrode to said second electrode; and
   d) an insulating coating covering said continuous strip of electrically-conductive material.

2. The fluorescent lamp according to claim 1, wherein said strip of electrically-conductive material comprises a vapor-deposited metal.

3. The fluorescent lamp according to claim 1, wherein said strip of electrically-conductive material is printed on said glass tube.

4. The fluorescent lamp according to claim 1, wherein said glass tube has a continuous longitudinal groove on the outer surface thereof, and said strip of conductive material is embedded in said longitudinal groove.

5. The fluorescent lamp of claim 1, further comprising:
   an insulating mount adjacent said second end of the glass tube for mounting said tube within a lamp housing.

6. A fluorescent lamp comprising:
   a) a gas discharge vessel in the form of a straight glass tube having a first electrode at a first end of the glass tube and a second electrode at a second end of the glass tube;
   b) an electronic ballast electrically connected to said first electrode, said ballast having a housing, and a base on said housing for connecting said ballast to a source of electrical power;
   c) an electrical conduit comprising a continuous strip of electrically-conductive material affixed to the outer surface of the glass tube, said strip electrically connecting said first electrode to said second electrode;
   d) a second electrical conduit interconnecting said first and second electrodes; and
   e) a capacitor mounted between one of said electrical conduits and said electronic ballast.

7. The fluorescent lamp according to claim 6, further including:
   an insulating coating covering said continuous strip of electrically-conductive material.

* * * * *